United States Patent

[11] 3,604,733

| [72] | Inventor | Franklin R. Hubbell, III<br>Brooklyn, Mich. |
|---|---|---|
| [21] | Appl. No. | 824,406 |
| [22] | Filed | May 14, 1969 |
| [45] | Patented | Sept. 14, 1971 |
| [73] | Assignee | Tenneco Inc.<br>Houston, Tex. |

[54] MECHANICAL SEAL FLANGE CONSTRUCTION
3 Claims, 4 Drawing Figs.

[52] U.S. Cl. .................................................. 285/334.5,
285/414
[51] Int. Cl. .................................................. F16l 25/00
[50] Field of Search .......................................... 285/368,
405–414, 424, 187, 334.5, 382, 382.4

[56] References Cited
UNITED STATES PATENTS

| 1,291,646 | 1/1919 | Hughes | 285/412 X |
| 2,303,311 | 11/1942 | Gredell | 285/412 X |
| 2,863,678 | 12/1958 | Gordon et al. | 285/334.5 X |

FOREIGN PATENTS

| 547,776 | 10/1922 | France | 285/334.5 |
| 1,192,613 | 4/1959 | France | 285/334.5 |

Primary Examiner—Dave W. Arola
Attorney—Harness, Dickey & Pierce

ABSTRACT: An attachment mechanism useful for securing an exhaust pipe to an exhaust manifold comprises an attachment pad which is loosely mounted on the exhaust pipe to engage a canted flange and resiliently press the flange against the manifold when the bolts are screwed home thereby tensioning the bolts and mechanically sealing the tube.

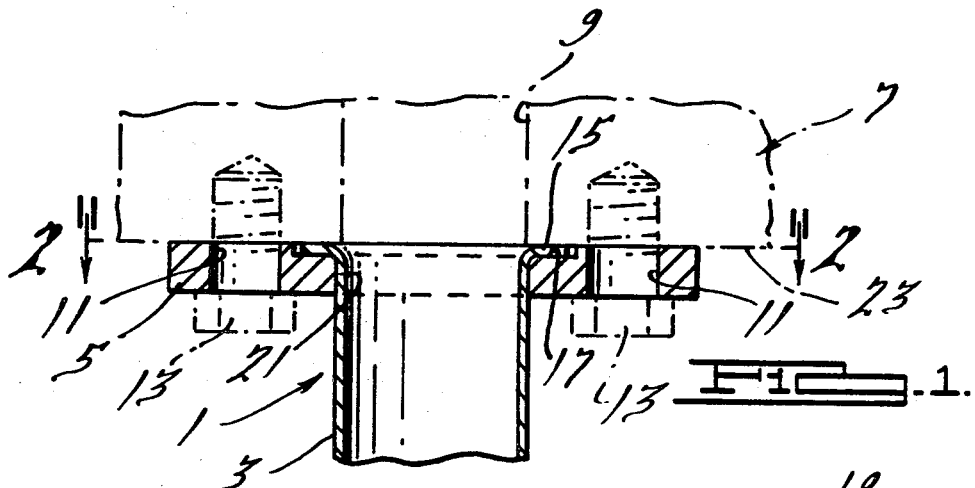
FIG. 1.
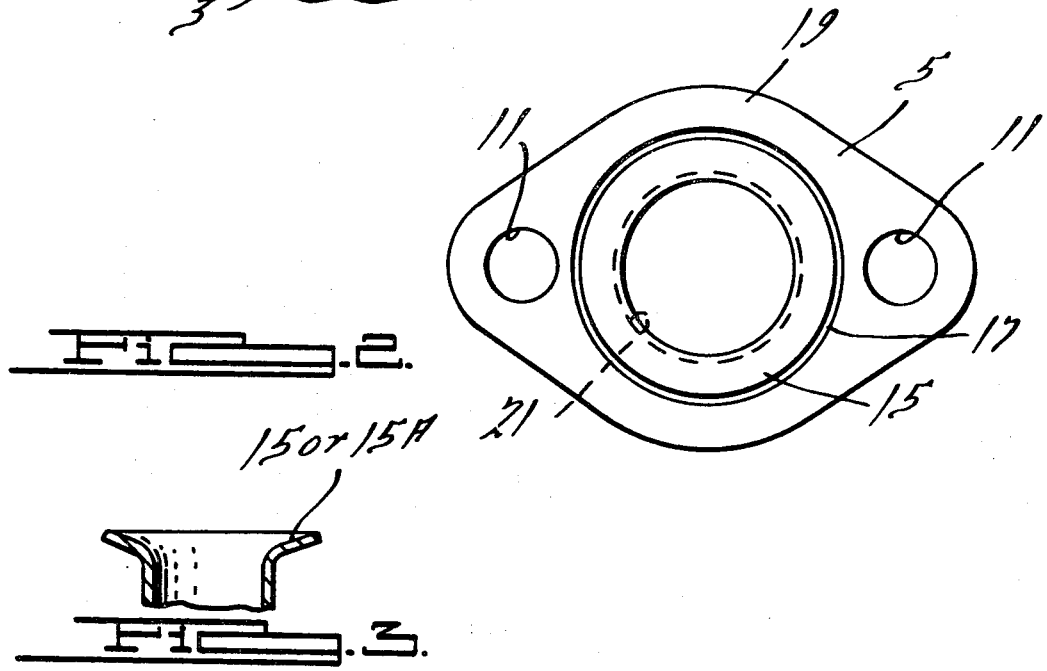
FIG. 2.
FIG. 3.
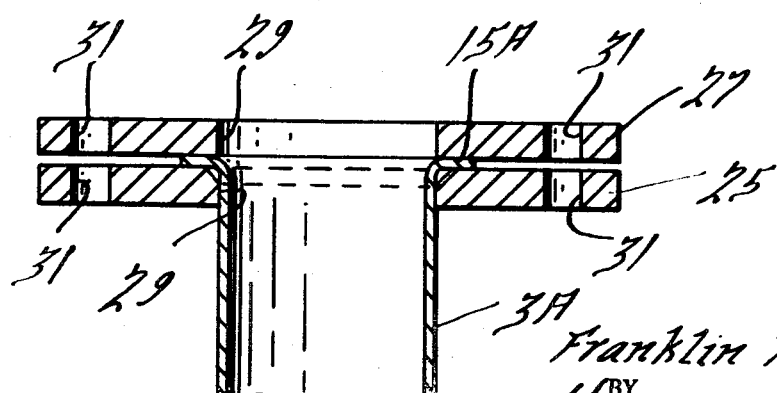
FIG. 4.
INVENTOR.
Franklin R. Hubbell III
BY
Harness, Dickey & Pierce
ATTORNEYS.

MECHANICAL SEAL FLANGE CONSTRUCTION

BRIEF SUMMARY OF THE INVENTION

It is the purpose of the invention to eliminate the conventional welding of an attachment pad to the end of an exhaust pipe. The invention does this by means of an arrangement in which the attachment pad for bolting to the exhaust manifold is loosely mounted on the pipe and engages a flange on the end of the pipe and when bolted in place, holds the flange in such a manner as to provide a gastight joint.

DESCRIPTION OF THE DRAWINGS

FIG. 1 is a cross section through a combined tube and pad in accordance with the invention, attachment bolts and housing, such as an exhaust manifold, being shown in phantom lines;

FIG. 2 is a cross section along the line 2—2 of FIG. 1;

FIG. 3 is a cross section broken away showing the nonperpendicular angle of the flange on the pipe prior to bolting of the assembly in place; and FIG. 4 is a cross section of a modified form of joint assembly.

DESCRIPTION OF THE INVENTION

The tube joint assembly 1 comprises a conduit 3 and an attachment pad 5 for securing the conduit 3 to a housing 7, such as an exhaust manifold, so that the interior of the conduit is in line with the fluid passage 9 in the housing 7. The attachment pad has bolt holes 11 through which bolts 13 extend to screw into the housing 7 and affix the tubing 3 to the housing in a fluidtight manner.

As seen in FIG. 2, the attachment pad 5 has a configuration which is substantially the same as that now employed on exhaust pipe pads but the conventional pads are normally welded to the end of a tube 3. In contrast, the present invention employs a radial flange 15 on the end of the tube 3 which in the embodiment of FIGS. 1 and 2 is received within a recess 17 in the attachment face 19 of the pad 5 when the pad is bolted in place, the tube extending through opening 21 in the pad. The recess is preferably about the same depth as and preferably no deeper than the thickness of the flange 15 so that the flange is pressed against the mating face 23 of the housing 7 to form a mechanical fluidtight seal. This contact of the flange with the face of the housing 7 is preferably enhanced by forming the flange 15 in a nonperpendicular plane with respect to the axis of the tube 3 as indicated in FIG. 3. Since the tube 3 is formed of metal, usually low carbon steel, it is resilient or elastic and when bent to the perpendicular position of FIG. 1 is stressed and seeks to return to the position of FIG. 3. This stressed condition of the flange 15 exerts a tension on the bolts 13 which resists loosening of the bolts and improves the effectiveness of the attachment.

In FIG. 4, a modified form is shown wherein the flange 15A of the tube 3A is held between two identical pads 25 and 27. The pads each have internal openings 29 which are substantially the same as the outer diameter of the tube 3A. The pad 25 is mounted on the tube whereas the pad 27 is positioned outside the tube end so that the two pads clamp the flange 15A between them when bolts extending through holes 31 are tightened to secure them to the housing 7. Flange 15A is preferably formed on an angle as indicated in FIG. 3 so that it is stressed by being bent to a position normal to the axis of the tube 3A. This will assist in the formation of a fluidtight seal between the two pads 25 and 27 as well as tension the attachment bolts.

It will be seen that in both forms of the invention, an effective mechanical seal is obtained but the annular weld between the tube and the pad is eliminated. Thus the manufacturing cost of the connection can be reduced with no sacrifice in its efficiency.

I claim

1. In a fluid flow system such as the exhaust system of an internal combustion engine, said system including a housing having a fluid passage, a tubular conduit for connection to the housing to communicate with the passage, said conduit having an axis and an annular flange at the housing end of the conduit extending radially with respect to the axis, an attachment pad having holes therein to receive bolts for attaching it to the housing, said pad having an opening therein smaller than said annular flange and said conduit extending through said opening, said pad being movable axially and angularly on said conduit prior to attachment to the housing and being forcibly pressed against said flange by attachment of the pad to said housing, the plane of said conduit flange making an acute angle with said axis and with the plane of the pad prior to attachment to the housing, said flange being bent into a plane substantially normal to said axis upon and by attachment of the pad to the housing whereby the tendency of the flange to elastically return to said acute angle position applies a tension to bolts holding the pad to the housing to inhibit loosening of the bolts, said pad having a recess in the face thereof that is attached to said housing, said recess being sized to receive said annular flange when said flange is in a plane substantially normal to said axis.

2. In a fluid flow system such as the exhaust system of an internal combustion engine, said system including a housing having a fluid passage, a tubular conduit for connection to the housing to communicate with the passage, said conduit having an axis and an annular flange at the housing end of the conduit extending radially with respect to the axis, an attachment pad having holes therein to receive bolts for attaching it to the housing, said pad having an opening therein smaller than said annular flange and said conduit extending through said opening, said pad being movable axially and angularly on said conduit prior to attachment to the housing and being forcibly pressed against said flange by attachment of the pad to said housing, the plane of said conduit flange making an acute angle with said axis and with the plane of the pad prior to attachment to the housing, said flange being bent into a plane substantially normal to said axis upon and by attachment of the pad to the housing whereby the tendency of the flange to elastically return to said acute angle position applies a tension to bolts holding the pad to the housing to inhibit loosening of the bolts, and a second pad for engaging the side of the annular flange which faces the housing, said second pad having an opening aligned with the conduit and bolt holes alignable with the holes in the first mentioned pad whereby the two pads may be attached by common bolts to the housing with the annular flange clamped between them and the outer face of the second pad pressed against the housing.

3. In a fluid flow system such as the exhaust system of an internal combustion engine, said system including a housing having a fluid passage, a tubular conduit for connection to the housing to communicate with the passage, said conduit having an axis and an annular flange at the housing end of the conduit extending radially with respect to the axis, an attachment pad having holes therein to receive bolts for attaching it to the housing, said pad having a wall portion defining an opening therein of constant internal diameter smaller than said annular flange and said conduit extending through said opening, said pad being movable axially and angularly on said conduit prior to attachment to the housing and being forcibly pressed against said flange by attachment of the pad to said housing, said pad having a planar face extending at substantially a right angle to the axis of the conduit, the plane of said conduit flange making an acute angle with said axis and with said face of the pad prior to attachment to the housing, said flange being bent into a plane substantially normal to said axis upon and by attachment of the pad to the housing whereby the tendency of the flange to elastically return to said acute angle position applies a tension to bolts holding the pad to the housing to inhibit loosening of the bolts.